(12) United States Patent
Whitehead et al.

(10) Patent No.: US 8,626,729 B2
(45) Date of Patent: Jan. 7, 2014

(54) DATABASE INDEX MONITORING SYSTEM

(75) Inventors: John Martin Whitehead, San Ramon, CA (US); Subrahmanyeswar Vadali, Dublin, CA (US); Kalur Sai Kishan, San Ramon, CA (US)

(73) Assignee: Oracle International Corporation, Redwood Shores, CA (US)

( * ) Notice: Subject to any disclaimer, the term of this patent is extended or adjusted under 35 U.S.C. 154(b) by 511 days.

(21) Appl. No.: 12/568,608

(22) Filed: Sep. 28, 2009

(65) Prior Publication Data

US 2011/0078135 A1 Mar. 31, 2011

(51) Int. Cl.
*G06F 17/30* (2006.01)

(52) U.S. Cl.
USPC .................... 707/696; 707/720; 707/E17.053

(58) Field of Classification Search
USPC .................................. 707/696, 720, E17.053
See application file for complete search history.

(56) References Cited

U.S. PATENT DOCUMENTS

| | | | |
|---|---|---|---|
| 5,960,423 A | 9/1999 | Chaudhuri et al. | |
| 6,266,658 B1 | 7/2001 | Adya et al. | |
| 7,730,045 B2* | 6/2010 | Barsness et al. | 707/696 |
| 2007/0130107 A1 | 6/2007 | Waas et al. | |
| 2007/0130130 A1* | 6/2007 | Chan et al. | 707/3 |
| 2007/0136386 A1* | 6/2007 | Burger | 707/200 |
| 2008/0307009 A1* | 12/2008 | Anderson et al. | 707/200 |
| 2010/0250504 A1* | 9/2010 | Balasubramanian et al. | 707/696 |

OTHER PUBLICATIONS

Oracle8i SQL Reference, Release 8.1.5, 1999, pp. 1-4.*
Obtaining Index Usage Information; obtained at http://www.sql-server-performance.com/articles/per/Obtaining_Index_Usage_Information_p1.aspx.
SQL Server Magazine: Tracking Index Usage; obtained at http://www.sqlmag.com/Articles/ArticleID/38789/38789.html?Ad=1.
How to get index uage information in SQL Server; obtained at http://www.mssqltips.com/tip.asp?tip=1239.
Counting index usage inside SQL; obtained at http://www.rampant-books.com/t_oracle_counting_index_usage_sql.htm.
Managing Indexes; obtained at https://cs.senecac.on.ca/~nconkic/DBAI_les12_Rev1_1.ppt.
Techniques for optimizing I/O; obtained at http://netra.montana.edu/docs/sas/Ircon/z1091089.htm.
Obtaining Index Usage Information; obtained at http://www.sql-server-performance.com/articles/per/Obtaining_Index_Usage_Information_p1.aspx, Jan. 5, 2009.
SQL Server Magazine: Tracking Index Usage; obtained at http://www.sqlmag.com/Articles/ArticleID/38789/38789.html?Ad=1, May 5, 2009.
How to get index uage information in SQL Server; obtained at http://www.mssqltips.com/tip.asp?tip=1239, May 5, 2009.

(Continued)

*Primary Examiner* — Albert Phillips, III
(74) *Attorney, Agent, or Firm* — Trellis IP Law Group, PC (57) ABSTRACT

An index monitoring system for selectively removing an index, where the index is used in a computerized database search. An example method implemented by the system includes displaying a list of indexes on the display device; providing an indication of an index usage criterion associated with each of two or more of the indexes, where the index usage criterion is derived at least in part from prior execution of a particular database query statement; displaying on the display device an indication of the particular database query statement; and optionally accepting a signal from a user-input device to remove an index.

9 Claims, 5 Drawing Sheets

(56) References Cited

OTHER PUBLICATIONS

Counting index usage inside SQL; obtained at http://www.rampant-books.com/t_oracle_counting_index_usage_sql.htm, May 3, 2009.

Managing Indexes; obtained at https://cs.senecac.on.ca/~nconkic/DBAI_les12_Rev1_1.ppt, 2001.

Techniques for optimizing I/O; obtained at http://netra.montana.edu/docs/sas/Ircon/z1091089.htm, May 5, 2009.

\* cited by examiner

DATABASE INDEX MONITORING SYSTEM

BACKGROUND

Databases are employed in various demanding applications, including Customer Relationship Management (CRM), search engines, corporate billing applications, and so on. Such applications demand versatile databases and accompanying mechanisms that can quickly access, insert, and modify data (called input/output or I/O operations) in the databases with minimal use of computing resources.

For the purposes of the present discussion, a database may be any collection of data. As database size increases, increased emphasis is placed on efficient database design to minimize computing resources and time required to perform I/O operations. I/O operations are often performed by Data Manipulation Languages (DMLs), such as Structured Query Language (SQL). Such I/O operations are often implemented via software running on a database server that communicates with the database.

Fast and efficient I/O operations are particularly important in large database applications, such as may exist in a production database environment with many databases. For example, an Oracle Customer Relationship Management On Demand (CRMOD) production environment may include several databases, including Oracle Online Transaction Processing (OLTP) and Online Analytical Processing (OLAP) databases.

To reduce the time to access, retrieve, or modify data in a database, the data therein is often organized by indexes. For the purposes of the present discussion, a database index may be any structure or mechanism for arranging data in a database to facilitate access to the data.

Database indexes often correspond to a subset of data in a given table of a database. The data subset corresponding to an index is often copied to a separate database structure, wherein the data is organized to facilitate I/O operations performed by DML statements. Certain simple indexes may correspond to one or more columns or rows of a database table. Indexes may also store results of certain functions or conditional expressions specifying a predetermined characteristic of database records or fields, e.g., fields with certain date ranges, value ranges, instances of capital letters, etc.

Indexes may be implemented via various data structures, such as balanced trees, B+ trees, hashes, and so on, to facilitate retrieving specific data from a database. An example phonebook database includes a table with several rows, where each row contains information describing a particular individual listed in the phone book. Without use of an index, retrieval of all persons with a given last name, for example, may require a search of all rows of the database, i.e., a full table scan. However, use of a B-tree index organized by last name could enable finding individuals with a given last name by a simple traversal of the tree until the leaf corresponding to the last name is found.

The computing resources used and the speed with which a database may be queried via DML statements are affected by the number of indexes in the database table being operated on. The time required to implement bulk data loads into a database often increases substantially as the number of indexes employed by the database increases. In addition, database indexes must often be maintained every time data is updated or modified. Accordingly unused indexes or rarely used indexes may burden database I/O operations.

Fast database performance often relies substantially upon good database design. Unfortunately, database designers may not anticipate all the ways a database may be used, and the database may be less efficient for certain applications than for others. Hence, it is often difficult to anticipate which indexes will not be used for a given application, and database performance suffers accordingly.

Alternatively, query optimizers can be employed to improve database I/O processing efficiency, such as the speed with which a query is performed based on indexes existing in a given database. An example query optimizer obtains information about certain database indexes in view of a given set of queries (called a workload). The query optimizer returns index information to facilitate implementing queries according to some processing sequence, called an execution plan. Each execution plan may have a certain cost in terms of estimated computing resource usage. Generally, the selected plan is associated with the lowest cost. Alternatively, a temporary dataset containing only needed variables is created in preparation for a given query. Unfortunately, the performance of such query optimizers is also degraded by the existence of many unused or otherwise not useful indexes.

The art generally lacks systems or methods to efficiently determine exactly what indexes are being used, how they are being used, whether the index should be removed from the database, and mechanisms for removing particular indexes.

SUMMARY

An example index monitoring system is adapted to selectively remove an index from a database, where the index is used for computerized database searches. The system implements a method, which includes displaying a list of indexes on a display device; providing an indication of an index usage criterion associated with each of two or more of the indexes, where the index usage criterion is derived in part from prior execution of a particular database query statement or other DML statement; and displaying on the display device an indication of the particular database query statement or DML statement. The results of performing these foregoing acts can further result in accepting a signal from a user-input device to remove an index.

In a specific embodiment, the index usage criterion includes how many times database query statements use the index. The display further indicates a period of time during which the index was used. This time period may be included in the usage criterion. The usage criterion may be further based upon whether the index was used for a first time during the period of time; the type of the particular database query statement that used the index; how many times any one or more database query statements accessed the index; how many times a particular type of database query statement accessed the index; whether the database query statement resulted in a full table scan; query statement performance; and so on. Such index and query statement characterizations may be displayed via the display device. The query statement may be implemented via a Structured Query Language (SQL) statement.

Certain embodiments disclosed herein may facilitate tracking certain characteristics of one or more indexes, including how often a given index is used, what statements use or have used the index, and index status, such as WATCH, KEEP, NEW, DROPPED, NEVER USED, used X times within a predetermined time interval, and so on. Such index characteristics may facilitate determining ways to restructure query statements or other I/O statements to use more desirable indexes; may facilitate determining statements that have performed full table scans, resulting in decreased database performance; may facilitate troubleshooting DML, e.g., SQL, performance issues; may facilitate research into statement execution behavior, such as unexpected behavior or execution plan changes; and so on.

By facilitating detection and removal or modification of unused or relatively not useful database indexes and corresponding DML statements used to access the statements, database performance may be significantly enhanced. Furthermore, database designers may be better informed as to how to improve future database design.

A further understanding of the nature and the advantages of particular embodiments disclosed herein may be realized by reference of the remaining portions of the specification and the attached drawings.

DETAILED DESCRIPTION OF EMBODIMENTS

Although the description has been described with respect to particular embodiments thereof, these particular embodiments are merely illustrative, and not restrictive. For example, while certain embodiments disclosed herein are discussed with respect to database applications, those skilled in the art may adapt such embodiments to other applications, such as computer code, where indexes are used to group certain functionality to facilitate access thereof, without departing from the scope of the present teachings.

Figure 1:
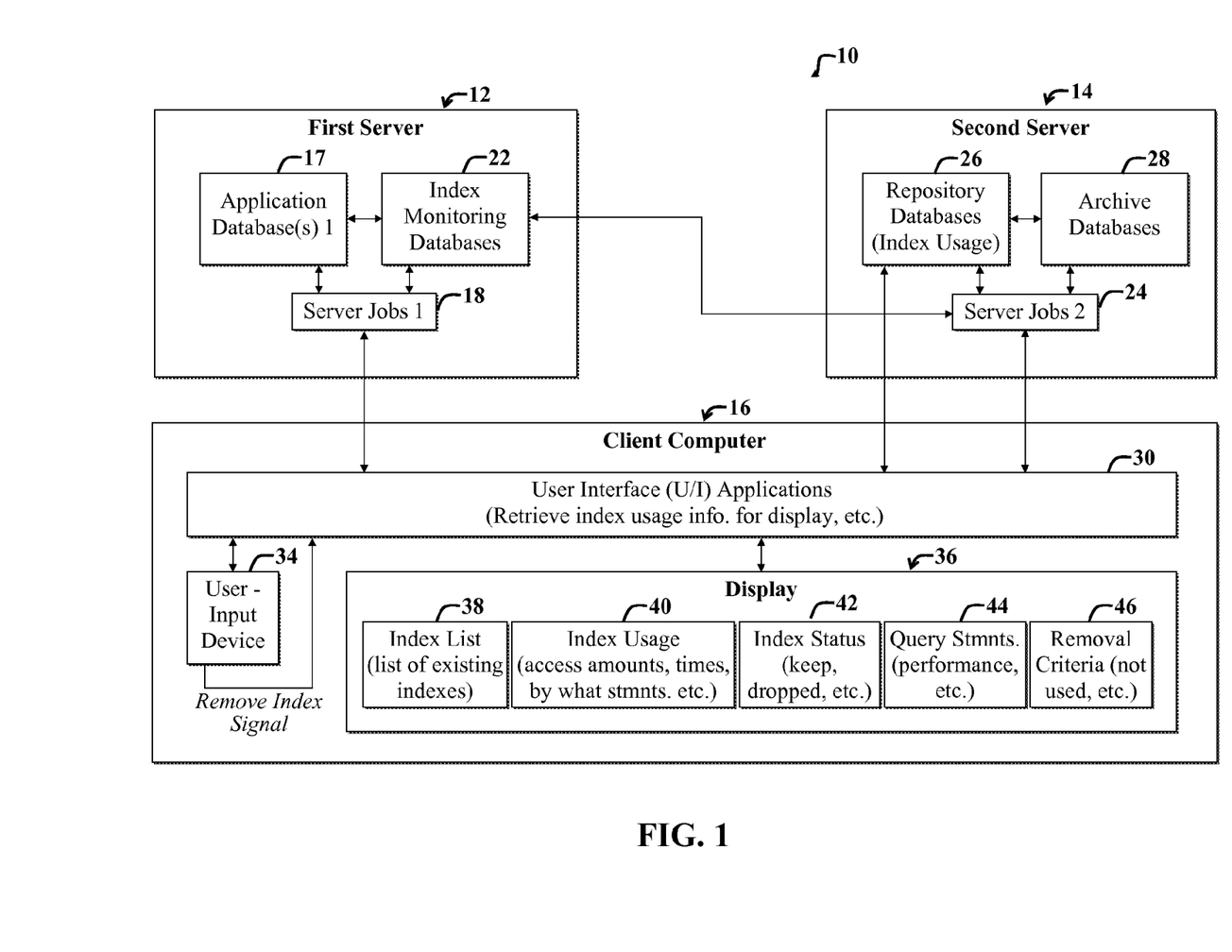
FIG. 1 is a diagram illustrating a first example embodiment of a system for facilitating tracking database index usage and removing certain indexes based on one or more predetermined criteria.

For clarity, certain well-known components, such as hard drives, processors, the Internet, Internet Service Providers (ISPs), firewalls, power supplies, and so on, have been omitted from the figures. However, those skilled in the art with access to the present teachings will know which components to implement and how to implement them to meet the needs of a given application FIG. 1 is a diagram illustrating a first example embodiment of a system 10 for facilitating tracking database index usage and removing certain indexes based on one or more predetermined criteria. The example system 10 includes a first database server 12 and a second database server 14 in communication with a client computer 16. In the present embodiment, the database servers 12, 14 represent computers upon which database software and software for performing I/O operations on the databases run. Alternatively, the term "database server" may refer to the particular software used to perform database I/O operations.

For illustrative purposes, the first server 12 is shown including one or more application databases 17, which are employed to store data for a particular application. A set of one or more index monitoring databases 22 store information pertaining to indexes used by the application databases 17. The various databases 17, 22 may be implemented via one or more tables and may include one or more indexes associated therewith. A first set of server jobs 18 communicates with the application databases 17 and the index monitoring databases 22. Note that the various databases 17, 22 may be called by different names in different applications, and the names used herein, e.g., application databases and index monitoring databases, are not intended to be restrictive. For example, the index monitoring databases 22 may be implemented via a single database to table and may include additional functionality beyond monitoring indexes or monitoring statement execution pertaining to the indexes.

In the present example embodiment, the client computer 16 runs one or more User Interface (U/I) applications 30, which communicate with the first set of one or more server jobs 18 running on the first server 12. U/I applications 30 further communicate with a second set of one or more server jobs 24 running on the second server 14. Alternatively, or in addition, the U/I applications 30 may communicate directly with the databases 17, 22, 26, 28 as needed. The second server 14 further includes one or more repository databases 26 for storing index information associated with the applications databases 17 to facilitate I/O operations on index data without burdening the first server 12. I/O operations on index information stored in the repository databases 26 may be performed via one or more jobs included in the second set of server jobs 24. The second server 14 further includes an archive database 28, which may be used to selectively archive records and fields of the repository databases 26. Note that while the databases 17, 22, 26, 28 are shown spread among two servers, more or fewer servers may be employed to accommodate the databases 17, 22, 26, 28 without departing from the scope of the present teachings.

The client computer 16 further includes U/I hardware 34, 36, including a user-input device 34, such as a keyboard and/or mouse, and so on, and a display 36, which communicate with the U/I applications 30. The display 36 and U/I applications 30 are adapted to display various index information stored in the repository databases 26. In the present example embodiment, the index information includes an index list 38, index usage information 40, index status 42, information about query statements 44 used to access the various indexes, and any additional index-removal criteria. For the purposes of the present discussion, index information may be any information describing or characterizing an index, such as how the index is used, what statements use the index, when the index is used, and so on.

The index list 38 may include a list of identifiers corresponding to different indexes. The index usage information 40 may include various statistics, such as indications of time periods during which indexes were used, how many times a given index is used in a predetermined time period, the number of times a particular query statement accessed the index, and so on. The query statement information 44 may include information about types of query statements were used to access a particular index, performance characteristics of a given query statement, whether a given query statement executed a full table scan of one or more tables of one or more of the applications databases 16, and so on. The index status information 42 may include various status identifiers describing each index. Examples of status identifiers include WATCH, KEEP, NEW, DROPPED, NEVER USED, used X times within a predetermined time interval, and so on.

Note that while the present embodiment is discussed with respect to query statements, such as SQL query statements or another DML query statements, information about other types of statements may also be maintained and tracked. For example, statements other than queries, such as statements that use a given index to update or modify database fields, may be tracked and displayed via the database 36.

In operation, the index monitoring databases 22 analyze operations of the application databases 16 to determine index usage information and corresponding DML statement execution information and then store the resulting information in the databases 22. One or more jobs or applications included in the first set of server jobs 18 may facilitate populating the index monitoring databases 22 with index information derived from analysis of the application databases 17. In addition, the first set of server jobs 18 may include instructions for periodically exporting data stored in the index monitoring databases 22 to the second server 24. The first set of server jobs 18 may also include instructions for interfacing the U/I applications to the databases 17, 22 to facilitate I/O operations initiated by the U/I applications 30.

The second server jobs 24 may include instructions for facilitating importing, into the repository databases 26, data exported from the index monitoring databases 22. The second server jobs 24 may further include instructions for maintaining the repository databases 26 and periodically archiving data therefrom into the archive database 28. The second set of server jobs 24 may also include instructions for interfacing the U/I applications 30 to the databases 26, 28 to facilitate I/O operations initiated by the U/I applications 30.

Exact details of computer code included in the first server jobs 18 and the second server jobs 24 are application specific. Those skilled in the art with access to the present teachings may readily implement appropriate jobs to meet the needs of a given application without undue experimentation. For example, in certain applications, it may be desirable to execute database truncations, log deletions, data deletions, databases summarizations, data importations, certain periodically scheduled purging operations, and so on, depending upon the application. In the present embodiment, the first set of server jobs 18 includes history table truncation, table extraction, periodic, e.g., daily data updates to the index monitoring databases 22, and so on.

After index usage data and corresponding statement usage data is exported to the repository databases 26, code executed via the U/I applications 30 running on the client computer 16 selectively displays portions of the data 38, 40, 42, 44 via the display device 36. With reference to the displayed data 38, 40, 42, 44, a user may ascertain, based on certain predetermined criteria, which indexes to remove, discard, modify, and so on. Functionality, e.g., instructions, included in the U/I applications 30 may further facilitate displaying predetermined criteria 46, based on the displayed data 38, 40, 42, 44, for deleting or removing an index from the applications databases 16. With reference to the displayed data 38, 40, 42, 44 and established criteria 46, a user may employ the user-input device 34 go generate a signal to the U/I applications 30. In the present example embodiment, the U/I applications 30 include instructions, e.g., software, adapted to receive a signal from the U/I device 34 and then optionally remove an index from the applications databases 16 if one or more index-removal criteria 46 are met. Examples of index removal criteria include an index that has never been used or that results in poor performance of DML statements that use the index. The removal criteria 46 may include an identification flag, which flags corresponding indexes for removal.

Note that details of the removal criteria 46 are application specific, as certain applications may allow less stringent removal criteria than others. For example, certain applications may benefit by removal of indexes that satisfy different criterion, such as indexes that cause DML performance problems, and so on. Some criteria may be applicable to certain applications and not for others. Those skilled in the art with access to the present teachings may readily determine appropriate index removal/modification criteria to meet the needs of a given application.

The U/I applications 30 may employ DML, such as one or more SQL statements, to selectively retrieve data from the repository databases 26 and to modify the applications databases 16, such as by removing indexes. Note that index-removal criteria 46 may be based on one or more data fields corresponding to the index usage 40, index status 42, query-statement information 44, and so on.

While the present embodiment is discussed with respect to databases coupled to or included in multiple servers, embodiments are not limited thereto. For example, an embodiment may be implemented on a single server or a single computer, which may run database software and U/I applications sufficient to monitor database index usage and to enable selective removal of database indexes based on predetermined criteria and in response to receipt of a signal from a user-input device.

Figure 2:
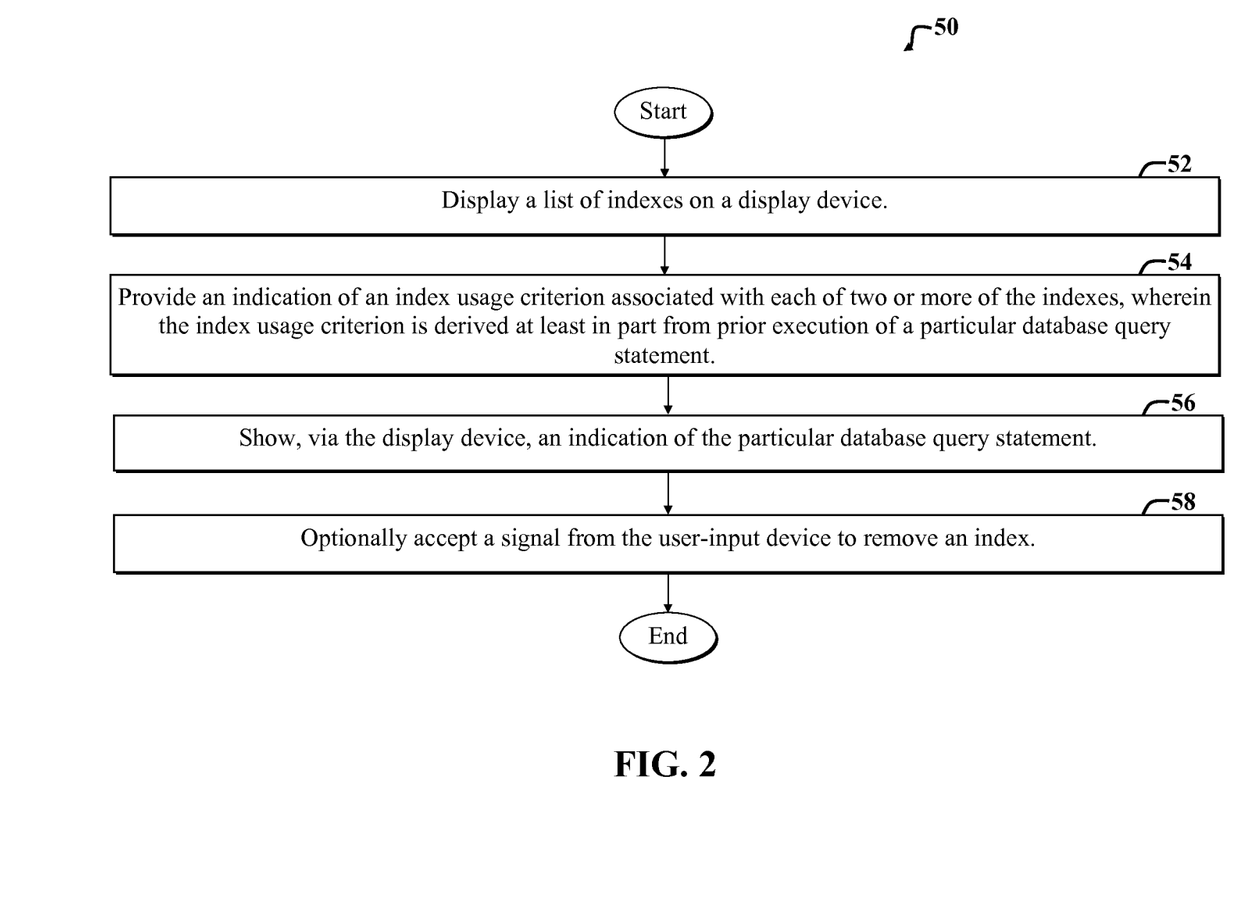
FIG. 2 is a flow diagram of a first example method adapted for use with the system of FIG. 1.

FIG. 2 is a flow diagram of a first example method adapted for use with the system of FIG. 1. The method includes a first step 52, which involves displaying a list of indexes on a display device.

A second step 54 includes providing an indication of an index usage criterion associated with each of two or more of the indexes. In the present embodiment, the index usage criterion is derived at least in part from prior execution of a particular database query statement or other DML statement. For example, a criterion for removal of an index may include an indication that a particular index has not been used within a particular time interval by a particular DML statement, such as a particular SQL query statement. An indication of such usage criterion may include a list of indexes and usage information associated with each particular index.

A third step 56 includes employing the display device to display an indication of the particular database query statement. The indication of a particular database query statement may include a list of query statement usage information corresponding to each index. The usage information may indicate which query statements were used to access which indexes.

A fourth step 58 includes optionally accepting a signal from the user-input device, such as a keyboard coupled to a client computer or coupled to a database server, to remove an index. Note, with reference to the system 10 of FIG. 1, that the client computer 16 may be implemented via one or more of the servers 12, 14 without departing from the scope of the present teachings.

Figure 3:
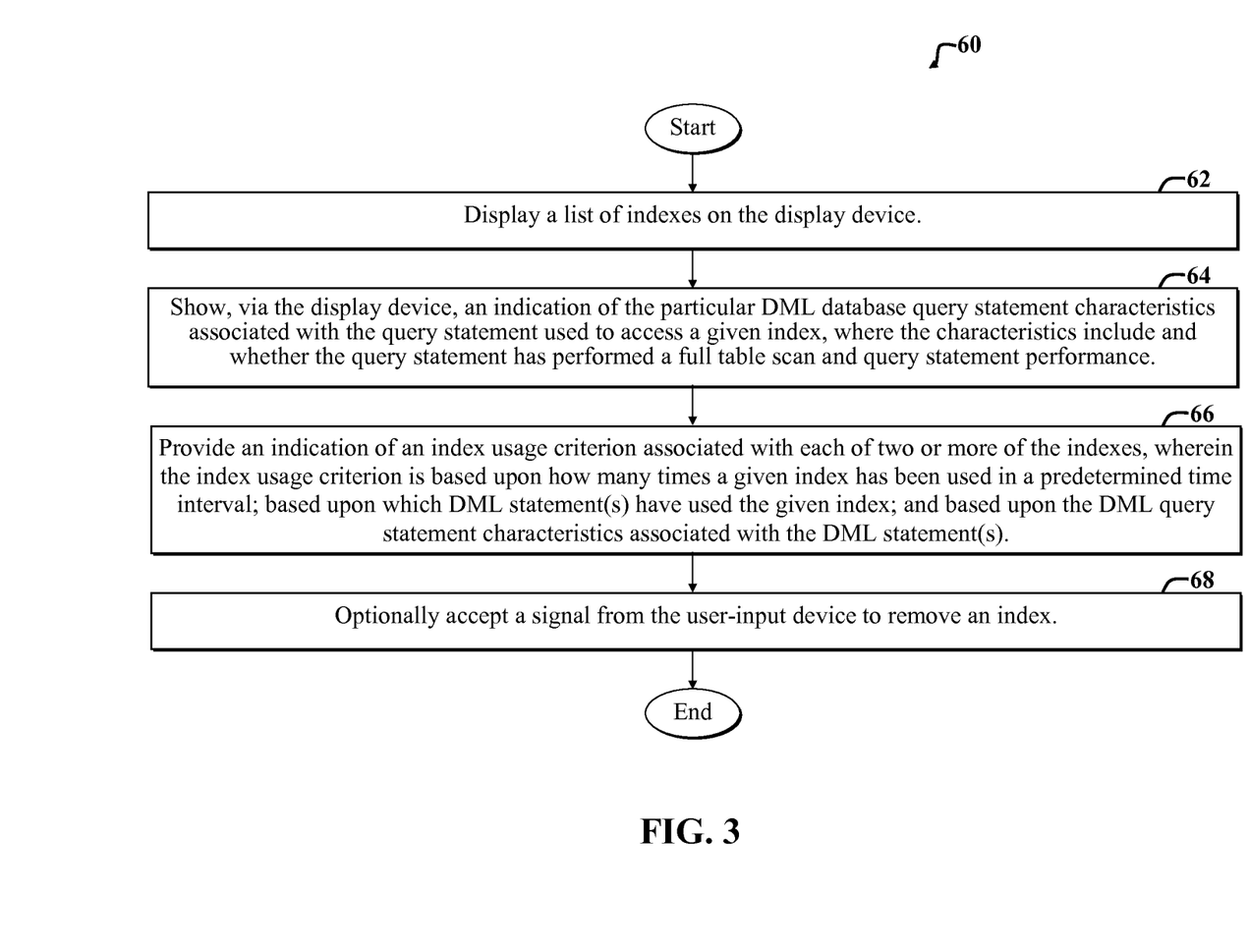
FIG. 3 is a flow diagram of a second example method adapted for use with the system of FIG. 1.

FIG. 3 is a flow diagram of a second example method 60 adapted for use with the system of FIG. 1. The method 60 includes an initial displaying step 62, which includes displaying a list of indexes or identifiers associated therewith on a display device.

In a subsequent indicating step 64, an indication of certain predetermined characteristics of a particular DML database query statement used to access a given index is displayed. The predetermined characteristics may include whether the query statement has performed a full table scan and may further include indications of query statement performance.

A subsequent providing step 66 includes providing an indication of an index usage criterion associated with each of two or more of the indexes. The index usage criterion may be based upon how many times a given index has been used in a predetermined time interval; what DML statement(s) have used the given index; and/or may be based upon predetermined characteristics of DML statements used.

Finally, an accepting step 68 includes optionally accepting a signal from the user-input device to remove an index based on the index usage criterion.

Figure 4:
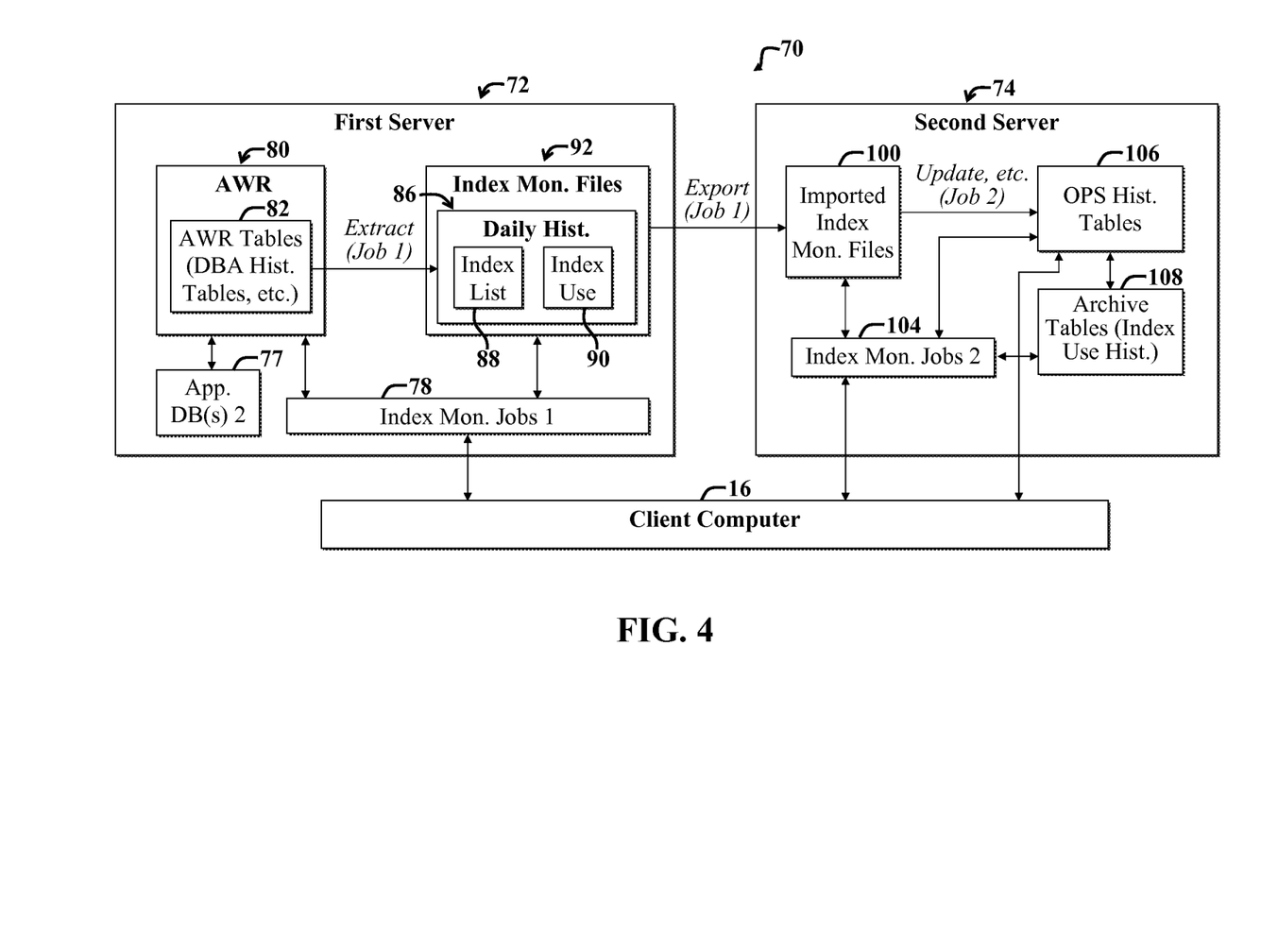
FIG. 4 is a diagram illustrating a second example embodiment of a system for monitoring database index usage.

FIG. 4 is a diagram illustrating a second example embodiment 70 of a system for monitoring database index usage in accordance with a particular application. The second system 70 includes a production server 72 and a portal server 74 in communication with a client computer 16.

The production server 72 includes a second set of application databases 77, which may be implemented via one or more Oracle databases. An Oracle Automatic Workload Repository (AWR) system communicates with the application databases 77 and maintains one or more AWR tables 82. The AWR tables 82 include Database Administrator (DBA) history tables that include information pertaining to indexes used by the application databases 77.

A first set of index monitoring jobs 78 communicates with the AWR 80 and includes instructions for extracting data from the AWR tables 82 and populating index monitoring files 92. The index monitoring files 92 include data for constructing index monitoring tables represented by one or more daily history databases 86, which include an index list 88, index usage information 90, and so on.

The first set of index jobs 78 further includes instructions for periodically, e.g., daily, exporting the index monitoring files 92 to the portal server 74. For illustrative purposes, the portal server 74 is shown including imported index monitoring files 100, Operations (OPS) tables 106, index usage archive tables 108, and a second set of index monitoring jobs 104, which may intercommunicate. The second set of index monitoring jobs 104 communicates with the imported index monitoring files 100, OPS history tables 106, and index usage archive tables 108.

The second set of index monitoring jobs 104 may include routines for updating and summarizing the imported index monitoring files 100 and then importing the resulting files to the OPS history tables 106 and populating them with index usage information, statement usage information associated with each index, and so on. The second set of jobs 104 may further include jobs for selectively archiving data from the OPS history tables in the index usage archive tables 108; for performing predetermined periodic table maintenance, and so on.

Exact functionality implemented via the first set of jobs 78 and the second set of jobs 104 is application specific. The jobs 78, 104 may include additional or less functionality than that disclosed herein without departing from the scope of the present teachings. Furthermore, the duration of time over which index information is maintained in the OPS history tables 106 is application specific, and may be more than 100 days in certain applications.

In operation, the AWR 80 periodically obtains and maintains database index information from the application databases 77. This information is then periodically retrieved into the index monitoring files 92 and then exported to the OPS history tables 106 on the portal server 74. Index information and corresponding statement access information may then be periodically retrieved, such as via one or more SQL query statements executed via the client computer 16. A user may employ software running on the client computer 16 to observe index usage information and then remove database indexes from the application database 77 as needed to enhance database performance.

The client computer 16 may employ various index usage criteria to facilitate determining which indexes should be removed. The criteria may be based on various index characteristics and/or characteristics of statements used to access the indexes, including but not limited to one or more of the following: how many times the particular database query statement use the index; a period of time during which the index was used; whether the index was used for a first time during the period of time; the type of the particular database query statement; how may times the particular database query statement accessed the index; how many times a particular type of database query statement accessed the index; whether the database query statement that resulted in a full table scan; and/or query statement performance. Such index and query statement characterizations may be displayed via a display of the client computer 16. The query statements may be implemented via a Structured Query Language (SQL) statement or other DML.

Conventionally, existing index monitoring systems may indicate that an index has been used or not. However, existing index monitoring systems typically do not facilitate determining whether an index is a viable candidate for removal from a database table and do not facilitate removal of the index from the database. The present embodiment may regularly draw and summarize index usage information from important AWR DBA history tables and then store the resulting information in one or more tables table, such as in the OPS history tables 106, for further access, such as by the client computer 16. A user of the client computer 16 may use software running on the client computer 16 that references the stored data to obtain important index information. The index information may indicate, for example, which indexes have never been used, which indexes were used for the first time during a particular time period, which indexes in a 'WATCH' status were used during a particular time period, what SQL statement was it that caused a particular index to be used one time in the past 30 days, what plan did the SQL statement use, whether there is a way to restructure the SQL to use a more desirable index, what SQL statement(s) executed unexpected full table scan(s), whether a particular SQL statement develops a performance problem, and so on.

Such information may facilitate analyzing, database performance based on frequency amount of index usage, which SQL statements cause an index to be used, and how often the SQL statements are executed, based on any new indexes added to the system, and so on. Furthermore, indexes may be analyzed based on status. For example, an index with a status of KEEP may be excluded from further usage tracking and summarization, but existing usage information may be maintained if needed. Such analysis may facilitate determining whether to remove or modify a database index. Note that index removal and modification may be automatic without departing from the scope of the present teachings.

The embodiment of FIG. 4 may be particularly useful for large database applications, such as the Oracle CRM On Demand product. Improvements in database indexing resulting from use of an embodiment disclosed herein may substantially improve database performance for a particular application. Furthermore, various embodiments disclosed herein may facilitate informing database designers and engineers as to which indexes have proven useful, and which indexes are degrading database performance while providing minimal benefit. This may facilitate improving future database design.

Figure 5:
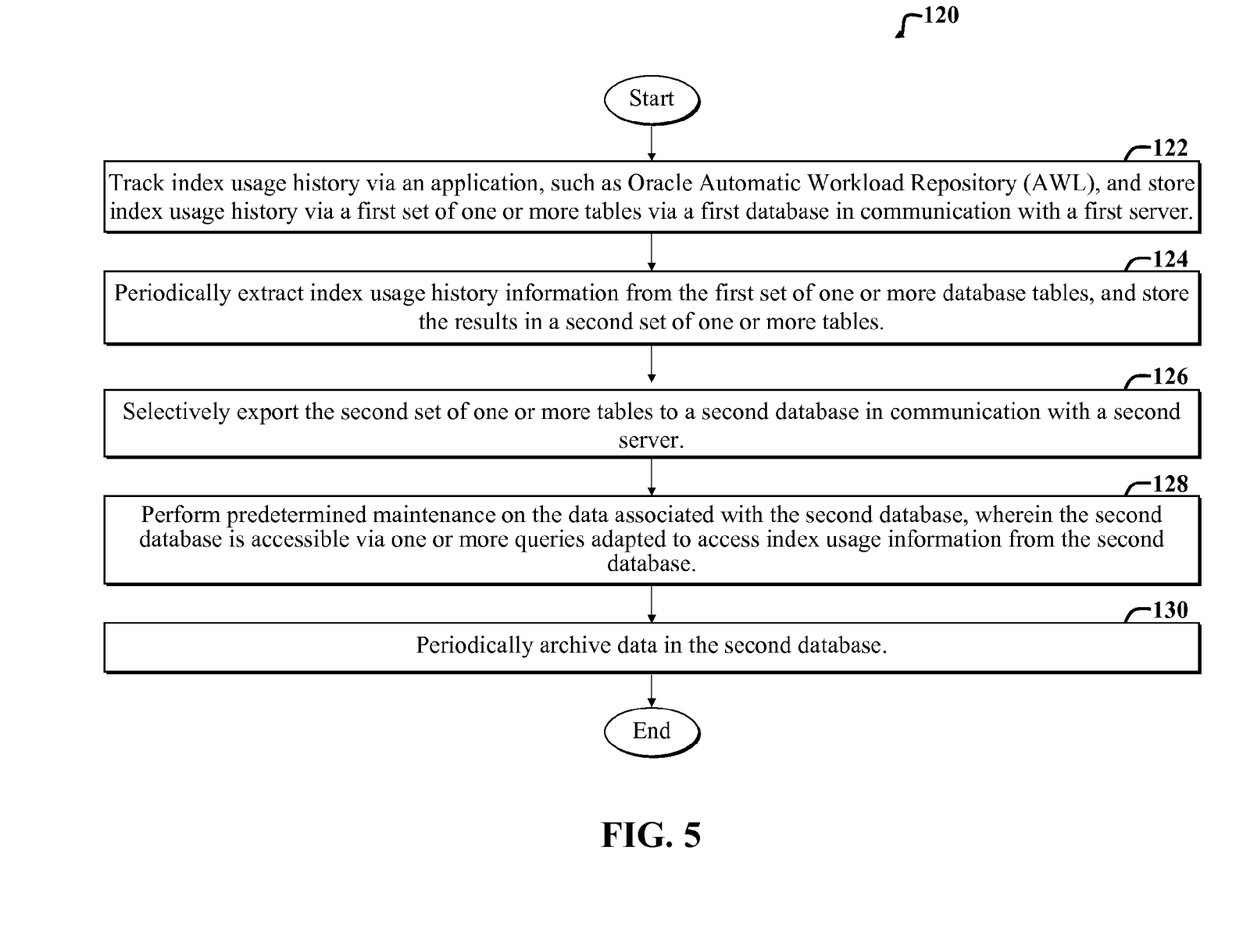
FIG. 5 is a flow diagram of a third example method adapted for use with the system of FIG. 4.

FIG. 5 is a flow diagram of a third example method 120 adapted for use with the system of FIG. 4. The example method 120 includes an initial index usage tracking step 122, which includes tracking index usage history via an application, such as Oracle Automatic Workload Repository (AWR), and storing index usage history via a first set of one or more tables via a first database in communication with a first server.

A subsequent extraction step 124 includes periodically extracting index usage history information from the first set of one or more database tables, and storing the results in a second set of one or more tables.

A subsequent exporting step 126 includes selectively exporting the second set of one or more tables to a second database in communication with a second server.

Next, a maintenance step 128 includes performing predetermined maintenance on the data associated with the second database. The second database is accessible via one or more queries that are adapted to access index usage information from the second database.

Finally, an archiving step 130 includes periodically archiving data in the second database.

While certain embodiments have been discussed with respect to mechanisms for indexes that are candidates for removal and then removing the indexes from a database, embodiments are not limited thereto. For example, an embodiment, whereby an index is not removed, but instead modified or otherwise adjusted is possible, without departing from the scope of the present teachings.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method performed by a server computer comprising:
   executing, using the server computer, a set of jobs to analyze operations of application databases and to populate index monitoring files, with the index monitoring files including an index list, index status information, query statement information and index usage information;
   outputting the index list, using the server computer and in response to a request from a client computer, for display on a display device of the client computer, with the index list including a list of identifiers corresponding to different indexes;
   outputting the query statement information, using the server computer and in response to a request from the client computer, for display on the display device of the client computer, with the query statement information being about types of query statement used to access a particular index, performance characteristics of a given query statement, and whether a given query statement executed a full table scan of one or more tables of one or more application databases;
   outputting the index status information, using the server computer and in response to a request from the client computer, for display on the display device of the client computer, with the index status information including status identifiers describing each index;
   outputting the index usage information, using the server computer and in response to a request from the client computer, for display on the display device of the client computer, with the index usage information for a particular index including one or more of information about how many times database query statements used the particular index, a period of time during which the particular index was used, whether the particular index was used for a first time during the period of time, the type of a particular database query statement that used the particular index, how many times any one or more database query statements accessed the particular index, how many times a particular type of database query statement accessed the particular index, whether the particular database query statement resulted in a full table scan, and query statement performance; and
   outputting index removal criteria information, using the server computer and in response to a request from the client computer, for display on the display device of the client computer, with the removal criteria information based on one or more of the index list, index usage information, index status information or query statement information and with the index removal criteria information listing pre-determined criteria based on frequency of use of an index and performance of queries that use the index.

2. The method of claim 1, wherein the index status information includes watch, keep, new, dropped, never used and used x times status identifiers.

3. The method of claim 1, wherein the database query statement is compliant with a Structured Query Language (SQL) format.

4. The method of claim 3, wherein the database query statement is compliant with an Oracle SQL format.

5. The method of claim 1, further comprising:

accepting a signal from the client computer to remove an index.

6. The method of claim 1 further including outputting, using the server computer, a flag for display on the display device of the client computer, with the flag indicating an index to be removed based on a displayed criterion.

7. An apparatus including:
a processing system including a processor, display and input/output device;
a non-transitory processor-readable storage device including instructions executable by the processor for:
executing a set of jobs to analyze operations of application databases and to populate index monitoring files, with the index monitoring files including an index list, index status information, query statement information and index usage information;
outputting the index list, in response to a request from a client computer, for display on a display device of the client computer, with the index list including a list of identifiers corresponding to different indexes;
outputting the query statement information, in response to a request from the client computer, for display on the display device of the client computer, with the query statement information being about types of query statement used to access a particular index, performance characteristics of a given query statement, and whether a given query statement executed a full table scan of one or more tables of one or more application databases;
outputting the index status information, in response to a request from the client computer, for display on the display device of the client computer, with the index status information including status identifiers describing each index;
outputting the index usage information, in response to a request from the client computer, for display on the display device of the client computer, with the index usage information for a particular index including one or more of information about how many times database query statements used the particular index, a period of time during which the particular index was used, whether the particular index was used for a first time during the period of time, the type of a particular database query statement that used the particular index, how many times any one or more database query statements accessed the particular index, how many times a particular type of database query statement accessed the particular index, whether the particular database query statement resulted in a full table scan, and query statement performance; and
outputting the index list, removal criteria information, in response to a request from the client computer, for display on the display device of the client computer, with the removal criteria information based on one or more of the index list, index usage information, index status information or query statement information and with the index removal criteria information listing pre-determined criteria based on frequency of use of an index and performance of queries that use the index.

8. The method of claim 7 further including outputting, for display on the display device of the client computer, a flag indicating an index to be removed based on a displayed removal criterion.

9. A non-transitory processor-readable storage device including instructions executable by a server computer, the non-transitory processor-readable storage device including one or more instructions for:
executing a set of jobs to analyze operations of application databases and to populate index monitoring files, with the index monitoring files including an index list, index status information, query statement information and index usage information;
outputting the index list in response to a request from a client computer, for display on a display device of the client computer, with the index list including a list of identifiers corresponding to different indexes;
outputting the query statement information, in response to a request from the client computer, for display on the display device of the client computer, with the query statement information being about types of query statement used to access a particular index, performance characteristics of a given query statement, and whether a given query statement executed a full table scan of one or more tables of one or more application databases;
outputting the index status information, in response to a request from the client computer, for display on the display device of the client computer, with the index status information including status identifiers describing each index;
outputting the index usage information, in response to a request from the client computer, for display on the display device of the client computer, with the index usage information for a particular index including one or more of information about how many times database query statements used the particular index, a period of time during which the particular index was used, whether the particular index was used for a first time during the period of time, the type of a particular database query statement that used the particular index, how many times any one or more database query statements accessed the particular index, how many times a particular type of database query statement accessed the particular index, whether the particular database query statement resulted in a full table scan and query statement performance; and
outputting index removal criteria information, in response to a request from the client computer, for display on the display device of the client computer, with the removal criteria information based on one or more of the index list, index usage information, index status information or query statement information and with the index removal criteria information listing pre-determined criteria based on frequency of use of an index and performance of queries that use the index.

* * * * *

UNITED STATES PATENT AND TRADEMARK OFFICE
CERTIFICATE OF CORRECTION

| | | |
|---|---|---|
| PATENT NO. | : 8,626,729 B2 | Page 1 of 1 |
| APPLICATION NO. | : 12/568608 | |
| DATED | : January 7, 2014 | |
| INVENTOR(S) | : Whitehead et al. | |

It is certified that error appears in the above-identified patent and that said Letters Patent is hereby corrected as shown below:

On the Title Page

On first page, column 2, under Other Publications, line 7, delete "uage" and insert -- usage --, therefor.

On first page, column 2, under Other Publications, line 21, delete "uage" and insert -- usage --, therefor.

In the Specification

In column 3, line 47, delete "application" and insert -- application. --, therefor.

In column 8, line 6, delete "may" and insert -- many --, therefor.

In the Claims

In column 11, line 50, in Claim 7, delete "outputting the index list," and insert -- outputting index --, therefor.

In column 12, line 1, in Claim 8, delete "The method of" and insert -- The apparatus of --, therefor.

Signed and Sealed this
Seventh Day of July, 2015

Michelle K. Lee
*Director of the United States Patent and Trademark Office*